(12) United States Patent
Feldpusch et al.

(10) Patent No.: US 10,608,841 B2
(45) Date of Patent: Mar. 31, 2020

(54) AUTONOMOUS SYSTEM BRIDGE CONNECTING IN A TELECOMMUNICATIONS NETWORK

(71) Applicant: Level 3 Communications, LLC, Broomfield, CO (US)

(72) Inventors: Michael E. Feldpusch, Westminster, CO (US); Jin-Gen Wang, Lafayette, CO (US); Austin D. Ritchie, Parker, CO (US)

(73) Assignee: Level 3 Communications, LLC, Broomfield, CO (US)

( * ) Notice: Subject to any disclaimer, the term of this patent is extended or adjusted under 35 U.S.C. 154(b) by 42 days.

(21) Appl. No.: 16/047,806

(22) Filed: Jul. 27, 2018

(65) Prior Publication Data

US 2019/0036733 A1 Jan. 31, 2019

Related U.S. Application Data

(60) Provisional application No. 62/538,148, filed on Jul. 28, 2017.

(51) Int. Cl.
*H04L 12/28* (2006.01)
*H04L 12/46* (2006.01)
(Continued)

(52) U.S. Cl.
CPC ...... *H04L 12/4625* (2013.01); *H04L 12/4675* (2013.01); *H04L 45/02* (2013.01);
(Continued)

(58) Field of Classification Search
CPC . H04L 12/4625; H04L 12/4675; H04L 45/02; H04L 45/04; H04L 43/50; H04L 61/103
See application file for complete search history.

(56) References Cited

U.S. PATENT DOCUMENTS

2004/0208175 A1* 10/2004 McCabe ................ H04L 45/04
370/389
2005/0169281 A1* 8/2005 Ko ......................... H04L 45/00
370/400

(Continued)

OTHER PUBLICATIONS

Cisco (IP Routing: BGP configuration guide, Cisco IOS XE Release 3S, 2013). (Year: 2013).*

(Continued)

*Primary Examiner* — Maharishi V Khirodhar

(57) ABSTRACT

Methods and systems for facilitating communication between two or more autonomous system instances include the instantiation of a bridge between the autonomous system (AS) instances. The bridge includes multiple virtual routers each of which is connected using a Layer 2 and a Layer 3 connection to a respective one of the AS instances. For example, each router may be connected to a respective AS instance by each of a virtual local area network (VLAN) connection and a Border Gateway Protocol (BGP) session. To facilitate the BGP session, the bridge may be assigned an AS number (ASN) different than that of each of the AS instances and that is exchanged between the routers and the AS instances. Routing within the bridge may be facilitated by the exchange of interior gateway protocol (IGP) information between the virtual routers.

18 Claims, 6 Drawing Sheets

(51) Int. Cl.
*H04L 29/12* (2006.01)
*H04L 12/715* (2013.01)
*H04L 12/751* (2013.01)
*H04L 12/26* (2006.01)

(52) U.S. Cl.
CPC ............ *H04L 45/04* (2013.01); *H04L 61/103* (2013.01); *H04L 43/50* (2013.01)

(56) References Cited

U.S. PATENT DOCUMENTS

| | | | | |
|---|---|---|---|---|
| 2006/0039391 | A1* | 2/2006 | Vasseur | H04L 45/04 370/409 |
| 2008/0181219 | A1* | 7/2008 | Chen | H04L 12/4641 370/389 |
| 2012/0166658 | A1* | 6/2012 | Kim | H04L 45/04 709/228 |
| 2014/0376371 | A1* | 12/2014 | Flinck | H04L 45/04 370/230 |
| 2016/0337174 | A1* | 11/2016 | Jorm | H04L 12/4641 |
| 2016/0337175 | A1* | 11/2016 | Rao | H04L 67/20 |

OTHER PUBLICATIONS

Wonkyoung et al. (Autonomous Client Discovery in Backbone Edge, 2010) (Year: 2010).*
Paul et al. (Scaling Provider Ethernet, 2008). (Year: 2008).*

* cited by examiner

AUTONOMOUS SYSTEM BRIDGE CONNECTING IN A TELECOMMUNICATIONS NETWORK

CROSS-REFERENCE TO RELATED APPLICATIONS

This application is related to and claims priority under 35 U.S.C. § 119(e) from U.S. Patent Application No. 62/538, 148, filed Jul. 28, 2017, titled "INTRA-AUTONOMOUS SYSTEM BRIDGE CONNECTING IN A TELECOMMUNICATIONS NETWORK," the entire content of which is incorporated herein by reference for all purposes.

TECHNICAL FIELD

Embodiments of the present invention generally relate to systems and methods for implementing a telecommunications network and more specifically for utilizing two or more virtual routers in a telecommunications network to provide a communication path between autonomous systems connected to the telecommunications network.

BACKGROUND

Telecommunication networks provide for the transmission of information across some distance through terrestrial, wireless or satellite communication networks. Such communications may involve voice, data or multimedia information, among others. In addition, telecommunication networks often offer features and/or services to the customers of the network that provide flexible and varied ways in which the communications are transmitted over the network. For example, some telecommunication networks provide Internet access to its customers, long distance communication capabilities, high definition audio and/or video communication capabilities, and the like. In other examples, the telecommunication network may be utilized to provide connectivity to one or more cloud-based resources offered by a third party. In other words, customers may purchase resources from a public cloud service to virtualize one or more of their processes and connect to such resources through a telecommunications network.

In some instances, the request services from a cloud environment in multiple locations or regions. For example, a customer to the telecommunications network may request a connection to the cloud environment in a first location (such as Dallas, Tex.) and a connection to the cloud environment in a different location (such as Denver, Colo.) in circumstances where the customer has sites or data centers in Dallas and Denver. In turn, the telecommunications network may attempt to connect the cloud regions such that the regions can exchange communications related to the cloud services provided to the customer. For example, the cloud environment may provide an automatic redundancy service to customers that stores data or other information in each region the customer is connected to the cloud environment. To facilitate the exchange of information between the cloud regions for the redundancy service, the network may connect the two cloud regions together through the network to exchange the redundant data. However, some cloud environments (or other networks) may not allow connections to other cloud environments (or other networks) for various business or other network operation considerations. In such instances, the cloud service may not be provided to the customer as desired. For example, backup or syncing between two regions of the network may require transmission of data over a network that may be public, unencrypted, or otherwise fail to meet the requirements of the customer.

SUMMARY

In one aspect of the present disclosure, a method for operating a telecommunications network is provided. The method includes receiving a request to connect a first autonomous system (AS) instance with a second AS instance, the first AS instance having a first AS number (ASN) and the second AS instance having a second ASN. A bridge including virtual routers is instantiated within the telecommunications network to facilitate communication between the first AS instance and the second AS instance. In one implementation, the bridge includes each of a first virtual router and a second virtual router that are communicatively coupled. The method further includes establishing a first Layer 2 connection and a first Layer 3 connection between the first virtual router and the first AS instance and establishing each of a second Layer 2 connection and a second Layer 3 connection between the second virtual router and the second AS instance.

In another aspect of the present disclosure, a method for transmitting traffic between AS instances is provided. The method includes receiving traffic from a first AS instance connected to a first virtual router of a bridge by each of a first Layer 2 connection and a first Layer 3 connection. The traffic is routed within the bridge from the first virtual router to a second virtual router of the bridge, the second virtual router being connected to a second AS instance by each of a second Layer 2 connection and a second Layer 3 connection. The traffic is then directed from the second virtual router to the second AS instance.

In yet another aspect of the present disclosure, a system for transmitting traffic between AS instances is provided. The system includes a computing device communicatively couplable to a telecommunications network. The computing device is configured to receive a request to connect a first AS instance with a second AS instance, the first AS instance having a first AS number (ASN) and the second AS instance having a second ASN. The computing device is further configured to instantiate a bridge within the telecommunications network to facilitate communication between the first AS instance and the second AS instance, the bridge including a first virtual router communicatively coupled to a second virtual router. The computing device is also configured to initiate each of a first Layer 2 connection and a first Layer 3 connection between the first virtual router and the first AS instance and each of a second Layer 2 connection and a second Layer 3 connection between the second virtual router and the second AS instance.

DETAILED DESCRIPTION

Figure 1:
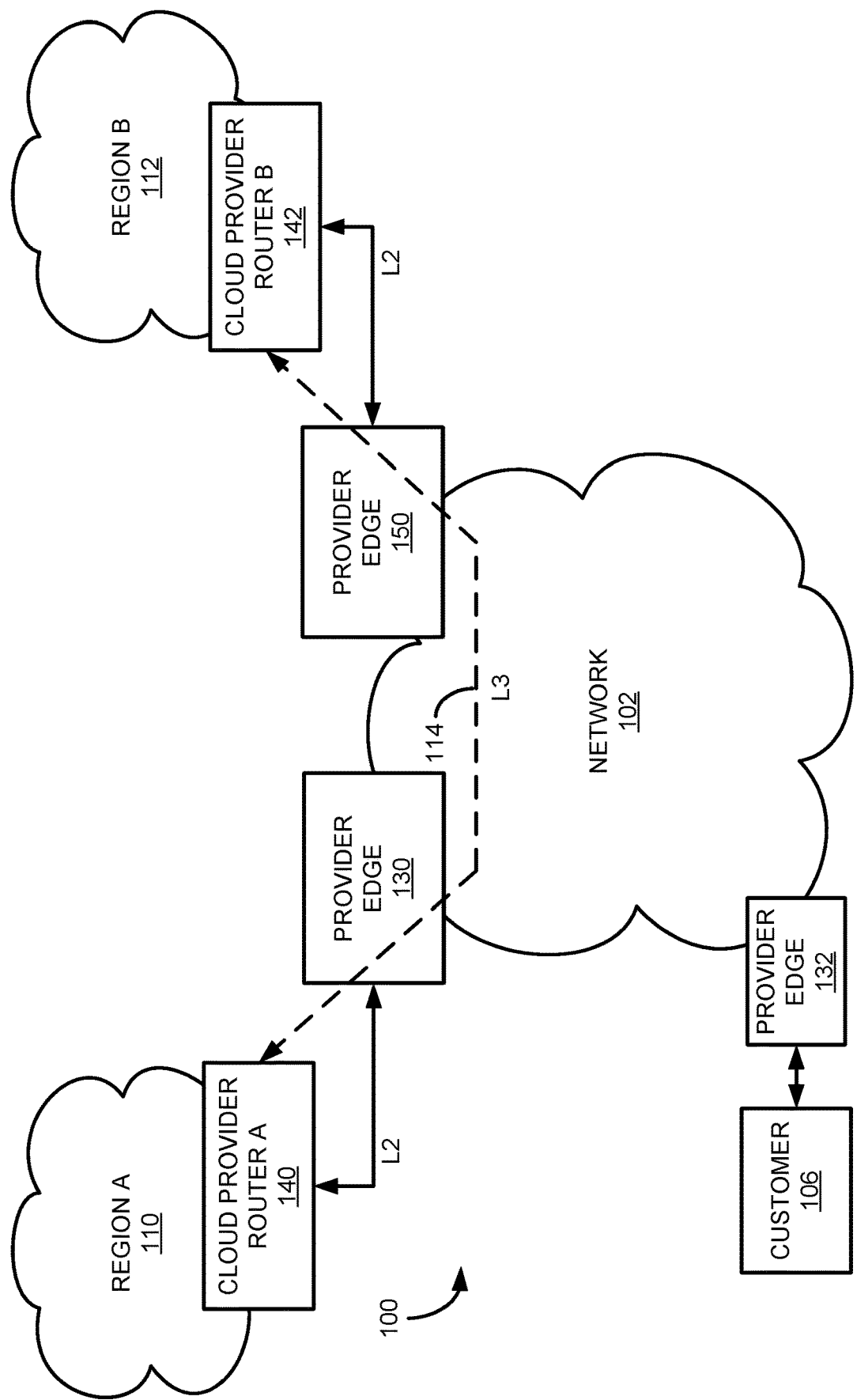
FIG. 1 is a schematic diagram illustrating a first network environment for creating a communication route between two autonomous system (AS) instances connected to the network.

Aspects of the present disclosure involve systems, methods, computer program products, and the like, for utilizing a virtual bridge in a telecommunications network to provide a communication path between two or more autonomous system (AS) instances connected to the network. The virtual bridge is assigned an AS number (ASN) unique from those of the AS instances and generally includes a virtual router for each AS instance to be connected through the bridge. Each virtual router may be connected to a respective AS instance by both a Layer 2 connection (e.g., a virtual local area network (VLAN) connection) and a Layer 3 connection (e.g., a Border Gateway Protocol (BGP) connection). The virtual routers of the bridge are also connected to each other, such as by exchanging Interior Gateway Protocol (IGP) information, to facilitate routing of traffic through the bridge.

For purposes of this disclosure, the term "autonomous system instance" or "AS instance" refers to a collection of connected Internet Protocol (IP) or similar routing prefixes under the control of one or more network operators. In certain cases, an AS instance may be both physically and logically unique such that the terms AS instance and AS are substantially interchangeable. For example, each AS instance may correspond to a different vendor network. In other cases, two or more AS instances may share a common routing framework or otherwise be representative of a common AS. For example, one AS instance may be located in and correspond to a first geographic region while the second AS instance may correspond to and be located in a second geographic region, however, each of the first AS instance and the second AS instance may correspond to a common AS. In such implementations, each AS instance may share identifying information, such as an AS number (ASN). Such multiple AS instances may be used, for example, to provide regional duplicates of a cloud environment.

In embodiments of the present disclosure, virtual routers provide a communication bridge between AS instances such as, for example and without limitation, regional AS instances implementing a cloud computing environment. A first AS instance, for example, may connect to a first virtual router of the telecommunications network while a second AS instance may connect to a second virtual router of the network. The virtual routers may then exchange communications to complete the bridge between the AS instances. In this manner, the telecommunications network may create a communication bridge through the virtual routers for the AS instances in circumstances where the AS instances will not otherwise facilitate or permit such a connection. The bridge may further implement or facilitate one or more network services for customers to the telecommunications network, such as creating a scrubbing network for customer traffic between the virtual routers and/or providing a translation adapter between autonomous systems that are otherwise incompatible. In general, the use of virtual routers may be used in the telecommunications network to create a communication bridge for any reason.

FIG. 1 is a schematic diagram illustrating a first network environment 100 for creating a communication route between two or more AS instances 110, 112 connected to the telecommunications network 102. In particular, the network environment 100 of FIG. 1 shows the connections formed through the network 102 to facilitate communication between a first regional AS instance ("region A") 110 and a second regional AS instance ("region B") 112 in response to connecting a customer 106 with a virtual cloud environment or other type of telecommunications network. Region A 110 can be accessed through a first provider edge device 130 of the network 102 in communication with a cloud provider router A 140. Similarly, region B 112 can be accessed through a second provider edge device 150 of the network 102 in communication with a cloud provider router B 142 of region B 112.

For purposes of the following discussion, region A 110 and region B 112 correspond to regional instances of a common AS implementing a cloud computing environment. However, as previously noted, implementations of the present disclosure are more generally directed to facilitating communication between AS instances, regardless of whether such instances correspond to a common AS framework. While region A 110 and region B 112 are used in the following example implementations, implementations of the present disclosure are not limited to such applications.

Referring back to FIG. 1, devices and/or network(s) of the customer 106 connect to the network 102 through a customer provider edge device 132. Through this connection, the customer 106 may communicate with one or more other networks or cloud environments, including but not limited to separate regions within the same cloud environment and different vendor networks. Although discussed herein as connecting to geographically separated regions within a cloud environment, it should be appreciated that the systems and methods described may apply to any networks that connect to the network 102 in multiple locations (either physically or logically). Further, the cloud environment may also connect to the network 102 in more than one location or connection point. For example, a cloud environment or network may connect in a first location or region (e.g., region A 110) through one provider edge (e.g., the first provider edge 130) and in a second location or region (e.g., region B 112) through another provider edge (e.g., the second provider edge 150). In one implementation, the cloud environment may connect a first cloud provider router, such as cloud provider router A 140 of region A 110, to the first provider edge 130 and a second cloud provider router, such as cloud provider router B 142 of region B 112, to the second provider edge 150. Although not illustrated in FIG. 1 for simplicity, the network 102 may also connect the customer 106 to each region 110, 112 of the cloud environment to facilitate exchange of traffic between the customer 106 and the cloud environment.

In some implementations and as part of providing connections to the cloud environment, the network 102 may also provide a communication tunnel or other communication route between two or more regions of the cloud environment connected to the network 102. For example, the network 102 may establish a communication tunnel 114, such as a private Ethernet connection, between cloud provider router A 140 and cloud provider router B 142 such that the routers in the different regions may exchange information at a Layer 2 level. In certain implementations, the Layer 2 connection between the regions may be implemented using a Virtual Local Area Network (VLAN) connection.

Establishment of a Layer 3 Border Gateway Protocol (BGP) connection may also be attempted through the network 102 for Layer 3 communication between the regions 110, 112. In general, BGP information (also referred to as a BGP session, BGP feed, or BGP data) is a table of Internet Protocol (IP) prefixes which designate network connectivity between autonomous systems or other separate networks. BGP information for a network route may include path (including next-hop information), network policies, and/or rule-sets for transmission along the path, among other information. A BGP feed may also include Interior Gateway Protocol (IGP) information for network routes within a given AS or network and/or other network information that pertains to the transmission of content from the network. BGP information mainly describes routes used by the network 102 to connect to external networks or customers (such as customer 106 and regions 110, 112) while IGP information describes routes through the network to connect one provider edge (such as provider edge 130) to another provider edge (such as provider edge 150) through the network 102.

The communication tunnel 114 may be used by the cloud environment to provide certain services to the customer 106, such as redundant back-up of data storage, failover protection, secured transfer of data through the communication route 114, etc. However, in some instances, establishing a direct Layer 3 BGP connection between the regions 110, 112 may not be allowed by the cloud environment. For example, due to various business or other operation considerations, a host of the cloud environment may prohibit or otherwise not support directly connecting different regions of the cloud environment. For example, during a BGP session between autonomous systems, the networks exchange AS numbers (ASNs) assigned to the respective autonomous systems for use in routing communications between the autonomous systems. Some autonomous systems, however, will not allow an exchange of the same ASN when two networks are connecting to each other through a BGP session. So, for example, if region A 110 and region B 112 are instances of a common AS and share an ASN, connection between region A 110 and region B 112 may be prohibited or otherwise not possible. Thus, the network 102 may receive an error message from the cloud environment when trying to establish a Layer 3 BGP connection between region A 110 and region B 112 of the cloud environment and the Layer 3 connection will not be established. Because a Layer 3 BGP connection cannot be established between region A 110 and region B 112, the customer 106 must generally rely on other connections through the network 102 to facilitate data transfer between the regions 110, 112 and such connections may not meet the security, privacy, encryption, or other needs of the customer 106.

Figure 2:
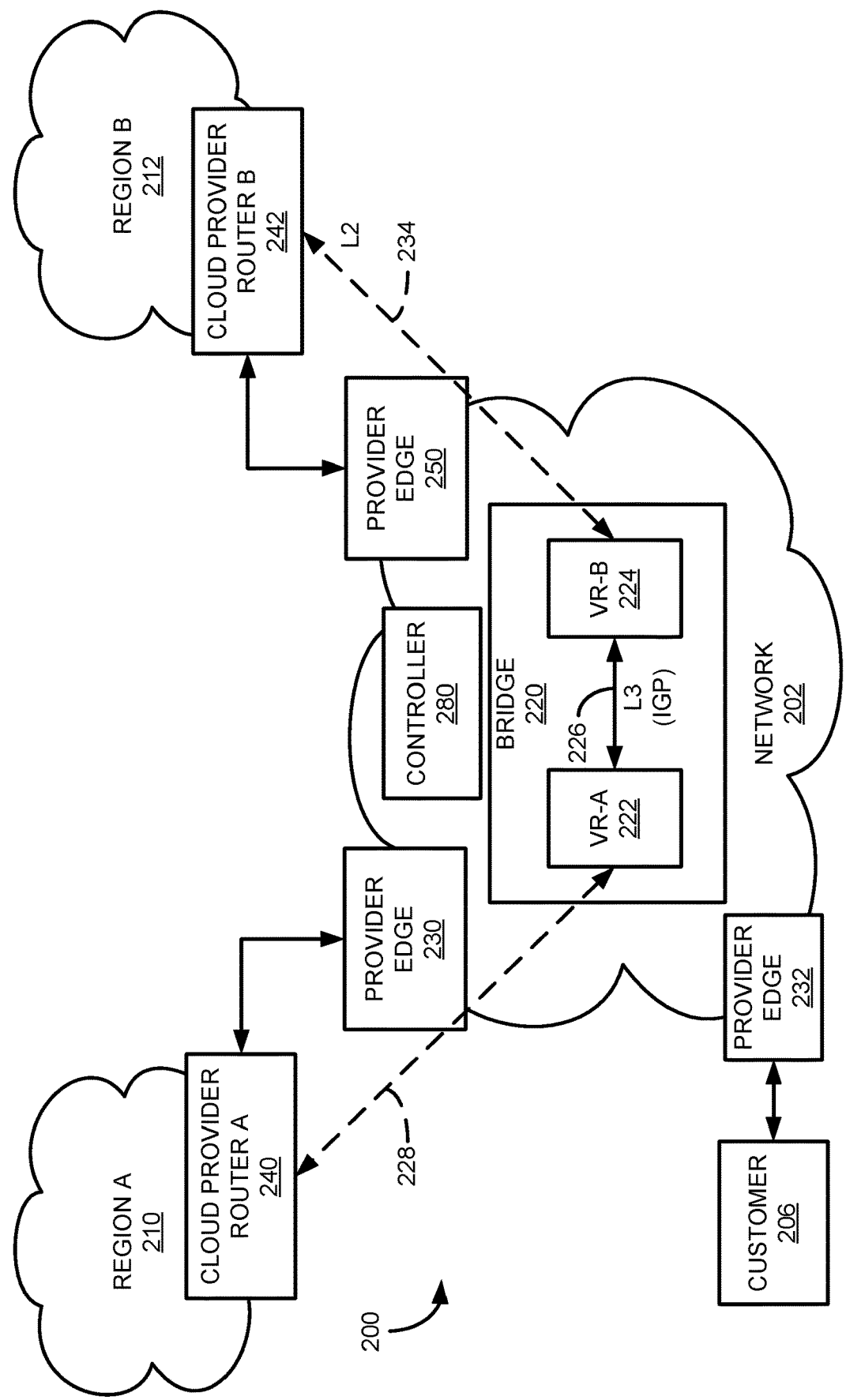
FIG. 2 is a schematic diagram illustrating a second network environment for creating a communication route between two AS instances connected to the network.

To address this issue, a virtual bridge may be created within the network 102 to facilitate communication between the regions 110, 112. In particular, FIG. 2 is a schematic diagram illustrating a second network environment 200 for creating a communication route between two AS instances. As in FIG. 1, the AS instances are discussed in the following example as being regional instances of a common AS framework/cloud computing environment, namely, region A 210 and region B 212. However, as previously noted implementations of the present disclosure are not limited to such implementations but may be more broadly implemented to connect and facilitate communication between any AS instances.

Many of the components of the network environment 200 are the same or similar to components in the network 100 configuration of FIG. 1. For example, customer 206 may be similar to customer 106 described above, network 202 may be similar to network 102, and each of cloud provider router A 240, cloud provider router B 242, and provider edges 230, 232, 250 may be similar to cloud provider router A 140, cloud provider router B 142, and provider edges 130, 132, and 150, respectively. However, included in network 202 is a virtual bridge 220 for providing a communication route between region A 210 (e.g., through cloud provider router A 240) and region B 212 (e.g., through cloud provider router B 242) of the cloud environment.

In one implementation, the virtual bridge 220 includes a first virtual router ("VR-A") 222 in communication with a second virtual router ("VR-B") 224. Each virtual router can be multi-tenant and may handle services for one or more customers connected to it. Although discussed herein as virtual routers, it should be appreciated that VR-A 222 and VR-B 224 may be physical routers, virtual routers, or a combination of virtual and physical routers. The virtual routers 222, 224 may operate as a router, switch, or other networking device of the network 202 by receiving communications or packets and routing the received packets based on an available routing table. To establish communication between the virtual routers 222, 224, interior gateway protocol (IGP) or similar information describing communication routes between the routers 222, 224 may be exchanged by the routers 222, 224. Although other topologies are possible, in certain implementations, a communication route may be defined between each pair of virtual routers such that transmission of traffic through the bridge is as direct and simple as possible. As discussed below in more detail, the IGP information defining routes between the virtual routers of the bridge may be updated in response to the addition or removal of virtual routers from the bridge 220.

Based on the IGP information, packets received at VR-A 222 may be transmitted to VR-B 224 through the network 202, and vice versa. In addition, a Layer 2 connection may be established between the virtual routers 222, 224 and a respective region 210, 212 of the cloud environment. For example, a first VLAN connection 228 may be established between cloud provider router A 240 of region A 210 and VR-A 222. Similarly, a second VLAN connection 234 may be established between cloud provider router B 242 of region B 212 and VR-B 224. Through this connection, a Layer 2 communication tunnel may be created between the regions 210, 212 of the cloud environment, namely cloud provider router A 240 to VR-A 222 through VLAN A 228, VR-A 222 to VR-B 224 through network 202, and VR-B 224 to cloud provider router B 242 through VLAN B 234.

Further, the virtual bridge 220 facilitates Layer 3 connection between the regions 210, 212 of the cloud environment through the network 202. For example, the bridge 220 can be treated as an AS distinct from the regions 210, 212 and may be assigned or otherwise associated with a unique ASN. The ASN associated with the bridge 220 may then be provided to region A 210 and region B 212 of the cloud environment through a BGP session. By doing so, the bridge 220 functions as an intermediary between the regions 210, 212 such that a direct (and possibly prohibited) connection between the regions 210, 212 no longer occurs. As a result, a Layer 3 connection between the regions 210, 212 is possible even if the regions 210, 212 share the same ASN or are otherwise incompatible.

It should be appreciated that the virtual bridge 220 may be used for connecting more than two regions 210, 212 of the cloud environment. For example, a third region of the cloud environment may be connected to the network 202. The third region may also share information from cloud region A 210 and/or cloud region B 212. In such an implementation, a third virtual router may be included in the virtual bridge 220 for establishing a Layer 2 and Layer 3 connection with the third region. The third virtual router may also share IGP routing information with the other virtual routers 222, 224 of the bridge 220 such that traffic from all routers is properly directed through the bridge 220. In this manner, any number of regions of the cloud environment may be connected to the virtual bridge 220 through a virtual router to interconnect the regions for information sharing. In certain implementations, virtual routers and the creation and removal of connections between any two or more virtual routers in the virtual bridge 220 may be created, removed, or modified dynamically. For example, as regions of the cloud environment are added or removed, the number of virtual routers of the virtual bridge 220 can be correspondingly increased or decreased, respectively, to account for the changes to the cloud environment. Moreover, as virtual routers of the virtual bridge 220 are added, removed, or modified, the connections between the virtual routers can similarly be added, removed, or modified to account for such changes.

In some embodiments, the connections between regions 210, 212 and the virtual bridge 220 may be established on a dynamic, on demand basis. For example, customer 206 may request a connection to regions 210, 212 for a certain period of time (e.g., during a specific time of day that facilitates syncing/backup cheaply or quickly, such as off peak hours). In that instance, VR-A 222 can route traffic to VR-B 224 in the telecommunications network for that period of time. When the period of time has expired, the connection between VR-A 222 and region 210, and VR-B 224 and the region 212 can be automatically disconnected by the controller.

In one implementation, the process of instantiating the bridge 220 and the virtual routers 222, 224 may be facilitated, at least in part, by a controller 280. For example, the controller 280 may receive a request from the customer 206 or other computing device in communication with the controller 280 to connect two or more AS instances, such as region A 210 and region B 212. In response, the controller 280 may execute one or more routines that spin up the bridge 220 (if the bridge 220 does not currently exist), populate the bridge 220 with the appropriate virtual routers, and initialize connection of the virtual routers with themselves and the cloud provider routers 240, 242. Such functions may be facilitated by one or more application programming interfaces (APIs) associated with each cloud network region (e.g., region A 210, region B 212). In certain implementations, the request received by the controller 280 includes configuration information such as, but not limited to, identification information for each region or AS instance to be connected. In response to receiving the configuration information, the controller 280 can automatically instantiate the bridge and/or initialize connection between virtual routers of the bridge and corresponding edge devices.

Figure 3:
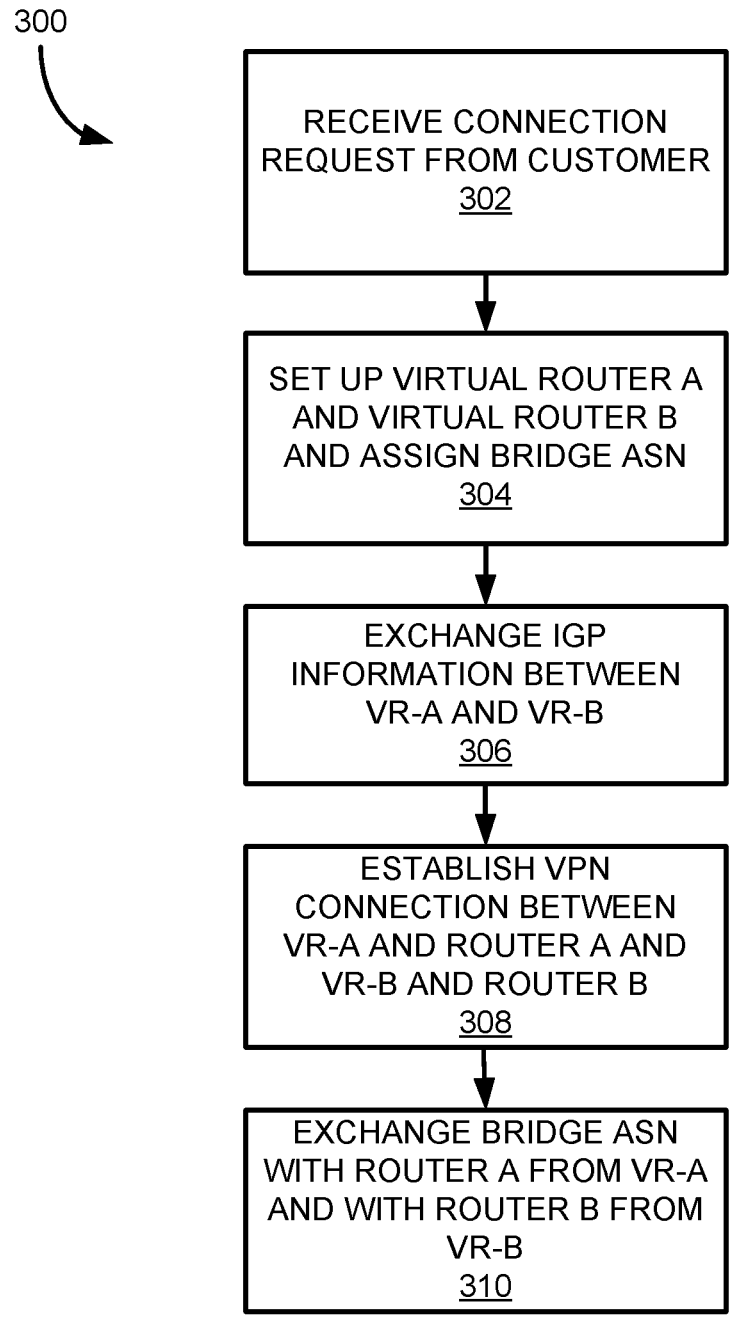
FIG. 3 is flowchart illustrating a method for utilizing two or more virtual routers in a telecommunications network to provide a communication path between AS instances connected to the network.

Utilizing the network configuration 200 of FIG. 2 as an example, FIG. 3 illustrates a flowchart of a method 300 for utilizing the virtual bridge 220 in the network 202 to provide a communication path between two or more routers, such as router A 240 and router B 242 of AS instances connected to the network 202. The operations of the method 300 may, in one embodiment, be performed by a controller 280 within the network 202 (or, in alternative embodiments, in communication with the network 202), such as in response to a request received from the customer 206 to connect AS instances corresponding to a cloud environment. In general, any component of the network 202 or associated with the network 202 may perform the operations of the method 300, either through one or more hardware components or software procedures.

Beginning at operation 302, the network 202 receives a request from the customer 206 to connect AS instances corresponding to the cloud environment. For example, the cloud environment may include multiple regional AS instances through which the environment connects to the network 202. For example, a cloud environment may include a first regional AS instance (e.g., region A 210) and a second regional AS instance (e.g., region B 212) connected to the network 202, with the instances being separated spatially or logically. Further, the connection request may include identifying information for particular network services to be applied to some or all traffic between the regions 210, 212.

In response to the request and in operation 304, the controller 280 (or similar computing device) creates or provisions a first virtual router (VR-A) 222 and a second virtual router (VR-B) 224 in the network 202. Provisioning of the virtual routers 222, 224 generally includes adding the virtual routers 222, 224 to a virtual bridge 220. If no such bridge has been created, the provisioning process may further include provisioning the virtual bridge 220 as well. In other implementations, the routers 222, 224 may be provisioned physical routers within the network 202. In addition to provisioning the routers 222, 224 and/or bridge 220, the controller 280 may assign a unique ASN to the bridge 220 to facilitate routing in BGP sessions with other devices. Also, in operation 306, the virtual routers 222, 224 may exchange IGP information to establish communication routes or paths between the provisioned virtual routers 222, 224 and any other virtual routers of the bridge 220.

In operation 308, each virtual router 222, 224 of the bridge 220 establishes a Layer 2 communication path with a respective region 210, 212 of the cloud environment. For example, VR-A 222 may set up a VLAN connection 228 with a router 240 of region A 210 for Layer 2 communication between the devices. Similarly, VR-B 224 may set up a VLAN connection 234 with a router 242 in region B 212 for Layer 2 communication. In one implementation, the Layer 2 communication path between each region 210, 212 and its respective virtual router 222, 224 may be established using Ethernet. The Layer 2 connections provide for a Layer 2 communication bridge between the regions 210, 212 of the cloud environment.

Similarly, each virtual router 222, 224 may establish a Layer 3 communication with a respective region 210, 212 of the cloud environment in operation 310. To establish the Layer 3 connection, the virtual routers 222, 224 may utilize the ASN assigned to the bridge 220 by the network 202. More particularly, the virtual router 222 of the bridge 220 may initiate a BGP session with the router 240 in region 210 of the cloud environment. In the BGP session, the virtual router 222 provides the ASN assigned to the bridge 220 by the network 202 for routing between the region 210 and the virtual router 222. Virtual router B 224 may perform a similar procedure with the router 242 of region B 212 of the cloud environment. Through the BGP sessions (utilizing the ASN for the virtual bridge 220), a Layer 3 connection is established between the virtual routers 222, 224 and the cloud environment regions 210, 212. Once the connections have been established, the cloud environment regions 210, 212 may exchange data and/or information over Layer 3 by utilizing the virtual routers 222, 224 as an intermediary between the regions.

Figure 4:
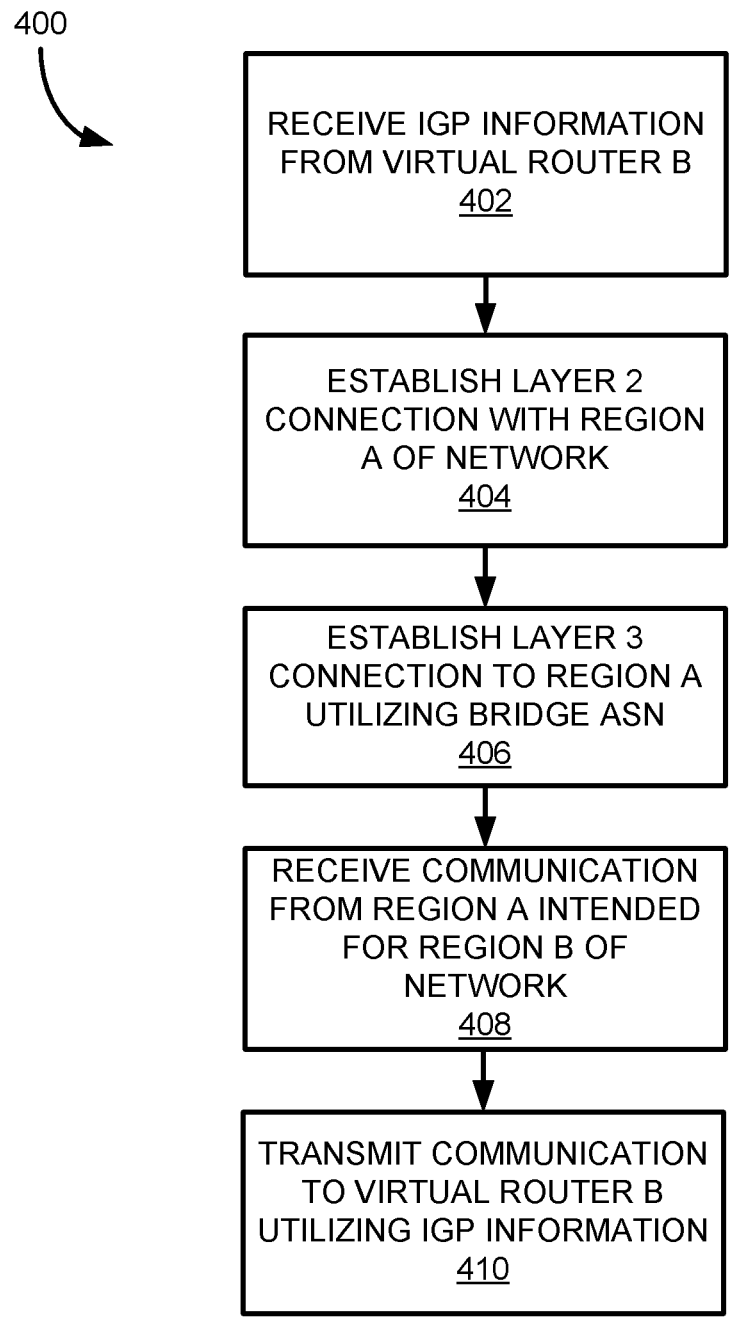
FIG. 4 is a flowchart illustrating a method for a virtual router of a virtual bridge to establish a communication route for transmission of communication packets.

FIG. 4 is a flowchart illustrating a method for a virtual router of a virtual bridge to establish a communication route for transmission of communication packets. The operations of the method 400 may, in one embodiment, be performed by a virtual router of a virtual bridge (such as VR-A 222). In general, however, any component of the network 202 or associated with the network may perform the operations of the method 400, either through one or more hardware components or software procedures.

Beginning in operation 402, the virtual router 222 may exchange IGP information with other virtual router 224 of the virtual bridge 220. This information provides routing information for transmitting communication packets between virtual routers 222, 224 in the bridge 220. In operation 404, the virtual router 222 establishes a Layer 2 connection to a corresponding region 210 of a network connected to the telecommunications network 202. In one embodiment, the Layer 2 connection is a VLAN connection. In a similar manner, the virtual router 222 establishes a Layer 3 connection with the corresponding region 210 through a BGP session with a router of the region in operation 406. The BGP information may include an ASN assigned to the bridge 220 for use in establishing connections with the regions of the cloud environment. With the IGP information, Layer 2 connection, and Layer 3 connection, the virtual router 222 may now provide a communication bridge for the region 210 to other regions 212 of the cloud environment.

In operation 408, the virtual router 222 receives a communication or data from region A 210 of the cloud environment intended for a device in region B 212 of the cloud environment. The communication is provided based on the Layer 2 and Layer 3 connections between region A 210 and the virtual router 222. Further, with the IGP routing information, the virtual router 222 may transmit the communication to virtual router B 224 in operation 410. In this manner, the virtual router 222 may receive and transmit communications between region A 210 and region B 212 of the cloud environment through virtual bridge 220 established by the network 202.

Figure 5:
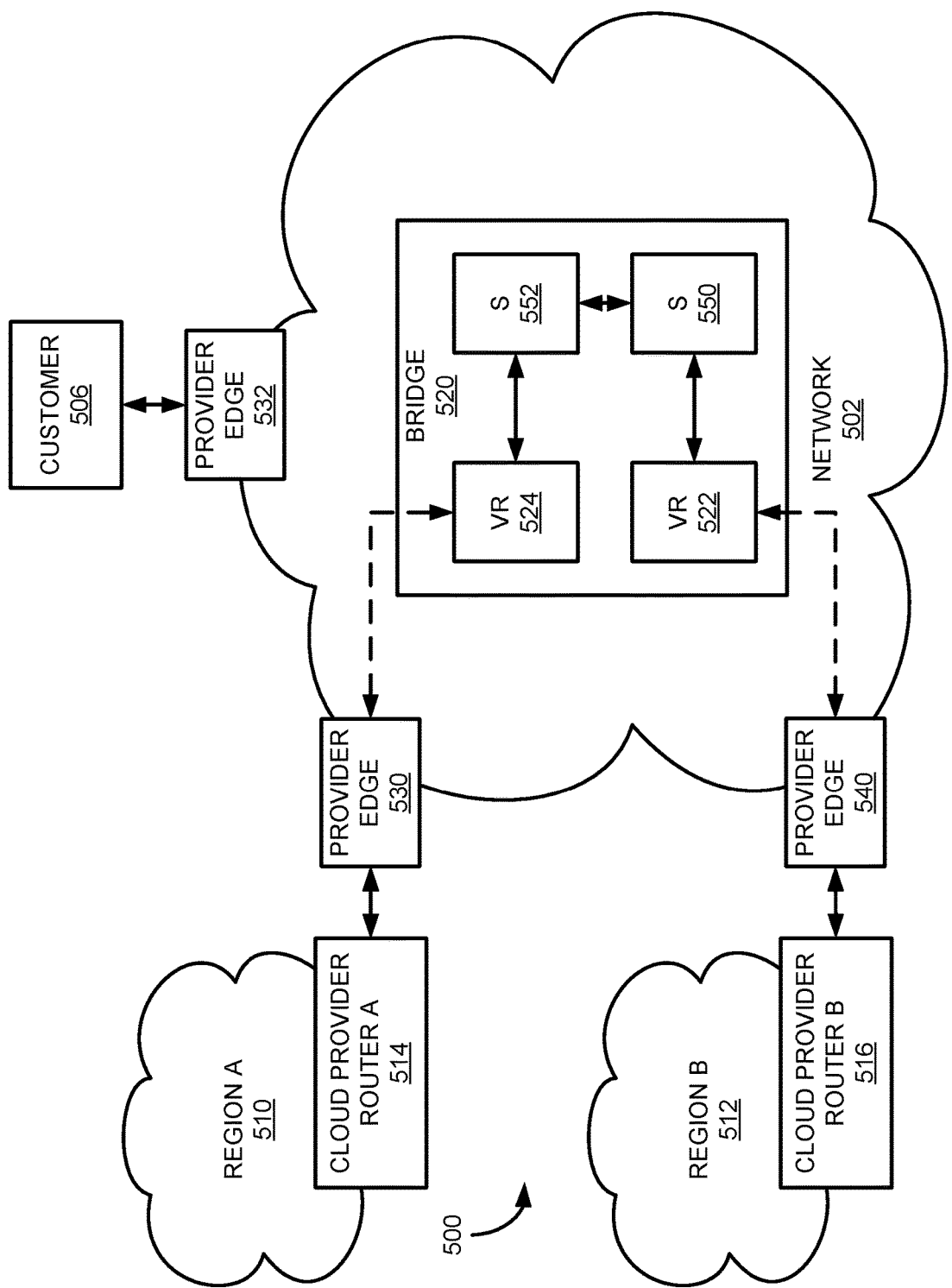
FIG. 5 is a schematic diagram illustrating a network environment for utilizing a virtual bridge to provide one or more telecommunication services to a customer of the network.

In addition to facilitating communications between AS instances, the virtual bridge 220 may also be utilized to provide one or more services to a customer. For example, in addition to backup/syncing between different cloud network regions, the virtual bridge 220 may be used to facilitate, among other things, one or more of traffic logging, network monitoring, testing, security, update or software deployment, packet scrubbing, and encryption. FIG. 5 is a schematic diagram illustrating a network environment 500 for utilizing a virtual bridge 520 to provide one or more telecommunication services, such as service 552 and/or service 550, to a customer 506 of the network 502. Many of the components of the network environment 500 are the same or similar to components in the network 200 configuration of FIG. 2, such as customer 506, network 502, virtual bridge 520, cloud environment region A 510, and cloud environment region B 512. However, in addition, or alternatively, to providing a bridge 520 to facilitate communication between regions 510, 512 of the cloud computing environment, the network 500 of FIG. 5 may be utilized to provide services 550, 552 to customer 506, as explained below. The services 550, 552 are illustrated in FIG. 5 as modules disposed between the virtual routers 522, 524 with each service 550, 552 being implemented as one of a hardware device, software module, or combination of hardware and software.

In general, the network 502 may create the virtual bridge 520 to provide services to customers of the network 502, such as customer 506, which is connected to the network 502 through provider edge 532. The services 550, 552 can relate to traffic between, from, or to different regions of a cloud network, such as region A 510 (which is connected to the network 502 through cloud provider router A 514 and provider edge 530) and region B 512 (which is connected to the network 502 through cloud provider router B 516 and provider edge 540). Thus, at least one of the virtual routers of the bridge 520 (i.e., one of virtual router ("VR") 522 and virtual router 524) connects to customer 506 through the network 502. In certain implementations, the services provided to the customer 506 may be in association with the customer's communications with the separate cloud regions 510, 512 of a cloud environment. For example, the customer may desire to incorporate services that scrub, encrypt, log, monitor, or otherwise interact with communications between the cloud regions 510, 512. To do so, cloud region A 510 may connect to the virtual router 524 of the virtual bridge 520 and cloud region B may connect to the virtual router 522. Virtual router 524 can then direct traffic to service 552 and then service 550 before the traffic is routed to virtual router 522 and on to region B 512. The connection of the virtual routers 522, 524 to the customer 506 and cloud environment regions 510, 512 may occur in a similar manner as described above in FIGS. 1 and 2. Thus, virtual router 522 may receive and transmit communication packets to/from the customer 506 and virtual router 524 may receive and transmit communication packets to/from the cloud network regions 510, 512.

As mentioned above, the virtual bridge 520 may provide one or more services to the customer 506. For example, the virtual bridge 520 may provide scrubbing services to packets received from cloud network regions 510, 512 to prevent or mitigate a distributed denial of service (DDoS) attack on the customer's devices. The services may provide credit card transactions, geographically diverse websites (to provide faster service to accessing users), or other services using secure, reliable geo-redundancy. Thus, between virtual router 524 and virtual router 522, one or more services 550, 552 may be provided within the virtual bridge 520 to provide a service for traffic exchanged between the regions 510, 512. Although two services 550, 552 are illustrated, it should be appreciated that any number of devices may be included in the bridge 520. Further, although only the customer 506 and the cloud network regions 510, 512 are illustrated as connected to the virtual bridge 520, other customers or networks may also be connected to the virtual bridge to receive the services provided by the bridge. For example, a second customer may connect to the bridge through another virtual router that also connects to one or more of the services 550, 552. In this manner, the network 520 may create one or more service-providing bridges 520 with virtual routers 522, 524 to provide particular services to customers or networks of the telecommunications network. The addition of more customers to receive the service may occur in a similar manner as describe above to create a virtual router in the bridge 520 and connect the customer to the created virtual router.

Figure 6:
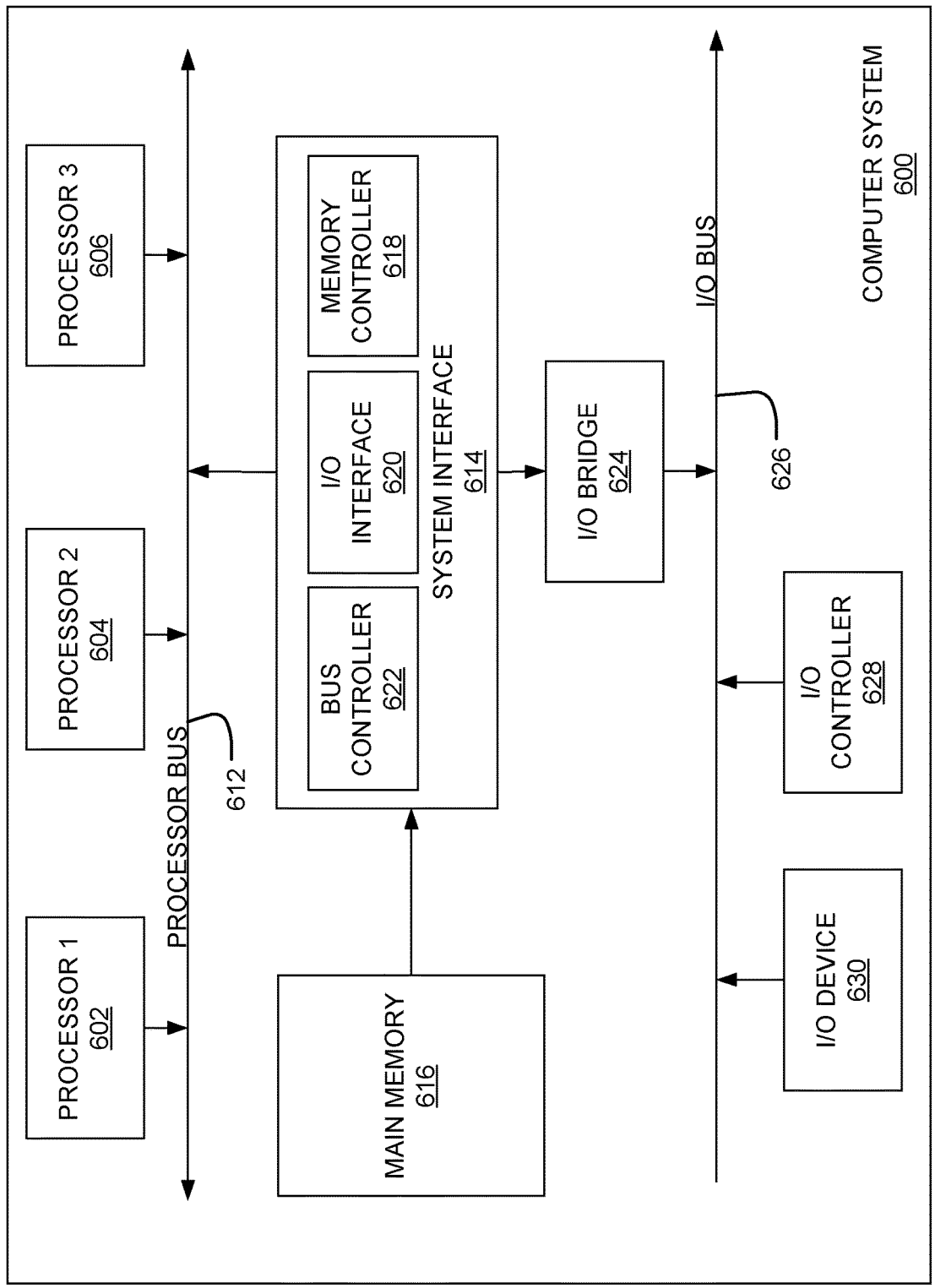
FIG. 6 is a diagram illustrating an example of a computing system which may be used in implementing embodiments of the present disclosure.

FIG. 6 is a block diagram illustrating an example of a computing device or computer system 600 which may be used in implementing the embodiments of the components of the network disclosed above. For example, the computing system 600 of FIG. 6 may be the virtual router of the bridge discussed above. The computer system (system) includes one or more processors 602-606. Processors 602-606 may include one or more internal levels of cache (not shown) and a bus controller or bus interface unit to direct interaction with the processor bus 612. Processor bus 612, also known as the host bus or the front side bus, may be used to couple the processors 602-606 with the system interface 614. System interface 614 may be connected to the processor bus 612 to interface other components of the system 600 with the processor bus 612. For example, system interface 614 may include a memory controller 618 for interfacing a main memory 616 with the processor bus 612. The main memory 616 typically includes one or more memory cards and a control circuit (not shown). System interface 614 may also include an input/output (I/O) interface 620 to interface one or more I/O bridges or I/O devices with the processor bus 612. One or more I/O controllers and/or I/O devices may be connected with the I/O bus 626, such as I/O controller 628 and I/O device 630, as illustrated. The system interface 614 may further include a bus controller 622 to interact with processor bus 612 and/or I/O bus 626.

I/O device 630 may also include an input device (not shown), such as an alphanumeric input device, including alphanumeric and other keys for communicating information and/or command selections to the processors 602-606. Another type of user input device includes cursor control, such as a mouse, a trackball, or cursor direction keys for communicating direction information and command selections to the processors 602-606 and for controlling cursor movement on the display device.

System 600 may include a dynamic storage device, referred to as main memory 616, or a random access memory (RAM) or other computer-readable devices coupled to the processor bus 612 for storing information and instructions to be executed by the processors 602-606. Main memory 616 also may be used for storing temporary variables or other intermediate information during execution of instructions by the processors 602-606. System 600 may include a read only memory (ROM) and/or other static storage device coupled to the processor bus 612 for storing static information and instructions for the processors 602-606. The system set forth in FIG. 6 is but one possible example of a computer system that may employ or be configured in accordance with aspects of the present disclosure.

According to one embodiment, the above techniques may be performed by computer system 600 in response to processor 604 executing one or more sequences of one or more instructions contained in main memory 616. These instructions may be read into main memory 616 from another machine-readable medium, such as a storage device. Execution of the sequences of instructions contained in main memory 616 may cause processors 602-606 to perform the process steps described herein. In alternative embodiments, circuitry may be used in place of or in combination with the software instructions. Thus, embodiments of the present disclosure may include both hardware and software components.

A machine readable medium includes any mechanism for storing or transmitting information in a form (e.g., software, processing application) readable by a machine (e.g., a computer). Such media may take the form of, but is not limited to, non-volatile media and volatile media. Non-volatile media includes optical or magnetic disks. Volatile media includes dynamic memory, such as main memory 616. Common forms of machine-readable medium may include, but is not limited to, magnetic storage medium; optical storage medium (e.g., CD-ROM); magneto-optical storage medium; read only memory (ROM); random access memory (RAM); erasable programmable memory (e.g., EPROM and EEPROM); flash memory; or other types of medium suitable for storing electronic instructions.

Embodiments of the present disclosure include various steps, which are described in this specification. The steps may be performed by hardware components or may be embodied in machine-executable instructions, which may be used to cause a general-purpose or special-purpose processor programmed with the instructions to perform the steps. Alternatively, the steps may be performed by a combination of hardware, software and/or firmware.

The description above includes example systems, methods, techniques, instruction sequences, and/or computer program products that embody techniques of the present disclosure. However, it is understood that the described disclosure may be practiced without these specific details. In the present disclosure, the methods disclosed may be implemented as sets of instructions or software readable by a device. Further, it is understood that the specific order or hierarchy of steps in the methods disclosed are instances of example approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

It is believed that the present disclosure and many of its attendant advantages should be understood by the foregoing description, and it should be apparent that various changes may be made in the form, construction and arrangement of the components without departing from the disclosed subject matter or without sacrificing all of its material advantages. The form described is merely explanatory, and it is the intention of the following claims to encompass and include such changes.

While the present disclosure has been described with reference to various embodiments, it should be understood that these embodiments are illustrative and that the scope of the disclosure is not limited to them. Many variations, modifications, additions, and improvements are possible. More generally, embodiments in accordance with the present disclosure have been described in the context of particular implementations. Functionality may be separated or combined in blocks differently in various embodiments of the disclosure or described with different terminology. These and other variations, modifications, additions, and improvements may fall within the scope of the disclosure as defined in the claims that follow.

We claim:

1. A method for operating a telecommunications network, the method comprising:

receiving a request to connect a first autonomous system (AS) instance with a second AS instance, the first AS instance having a first AS number (ASN) and the second AS instance having a second ASN, wherein the first AS instance and the second AS instance are instances of a common AS such that the first ASN and the second ASN are the same;

instantiating, in response to receiving the request, a bridge within the telecommunications network to facilitate communication between the first AS instance and the second AS instance, the bridge including a first virtual router communicatively coupled to a second virtual router;

associating, in response to receiving the request, the bridge with a bridge ASN, the bridge ASN being different from the first ASN and the second ASN;

establishing each of a first Layer 2 connection between the first virtual router and the first AS instance and a second Layer 2 connection between the second virtual router and the second AS instance; and establishing each of a first Layer 3 connection between the first virtual router and the first AS instance and a second Layer 3 connection between the second virtual router and the second AS instance.

2. The method of claim 1, wherein each of the first Layer 2 connection and the second Layer 2 connection are virtual local area network (VLAN) connections.

3. The method of claim 1, wherein establishing each of the first Layer 3 connection and the second Layer 3 further comprises providing the bridge ASN to the first AS instance and the second AS instance during respective Border Gateway Protocol (BGP) sessions.

4. The method of claim 1, wherein instantiating the bridge further comprises exchanging Interior Gateway Protocol (IGP) information between the first virtual router and the second virtual router for routing communications between the first virtual router and the second virtual router.

5. The method of claim 1 further comprising:

receiving a second request to connect each of the first AS instance and the second AS instance to a third AS instance;

adding a third virtual router to the bridge, the third virtual router communicatively coupled to each of the first virtual router and the second virtual router;

establishing a third Layer 2 connection between the third virtual router and the third AS instance; and establishing a third Layer 3 connection between the third virtual router and the third AS instance.

6. The method of claim 1 further comprising routing traffic between the first AS instance and the second AS instance through the bridge.

7. The method of claim 1 further comprising automatically disconnecting the bridge from at least one of the first AS instance and the second AS instance in response to a predetermined period of time expiring.

8. A system for transmitting traffic between autonomous system instances, the system comprising:

a computing device communicatively couplable to a telecommunications network, the computing device configured to:

receive a request to connect a first autonomous system (AS) instance with a second AS instance, the first AS instance having a first AS number (ASN) and the second AS instance having a second ASN, wherein the first AS instance and the second AS instance are instances of a common AS such that the first ASN and the second ASN are the same;

instantiate, in response to receiving the request, a bridge within the telecommunications network to facilitate communication between the first AS instance and the second AS instance, the bridge including a first virtual router communicatively coupled to a second virtual router;

associate, in response to receiving the request, the bridge with a bridge ASN, the bridge ASN being different from the first ASN and the second ASN;

initiate each of a first Layer 2 connection between the first virtual router and the first AS instance and a second Layer 2 connection between the second virtual router and the second AS instance; and initiate each of a first Layer 3 connection between the first virtual router and the first AS instance and a second Layer 3 connection between the second virtual router and the second AS instance.

9. The system of claim 8, wherein the computing device is further configured to initiate each of the first Layer 2 connection and the second Layer 2 connection includes initiating respective virtual local area network (VLAN) connections.

10. The system of claim 8, wherein initiating each of the first Layer 3 connection and the second Layer 3 connections includes initiating Border Gateway Protocol (BGP) sessions in which the bridge ASN is provided to the first AS instance and the second AS instance by the first virtual router and the second virtual router, respectively.

11. The system of claim 8, wherein the computing device is further configured to:

receive a second request to connect each of the first AS instance and the second AS instance to a third AS instance;

add a third virtual router to the bridge, the third virtual router communicatively coupled to each of the first virtual router and the second virtual router;

initiate a third Layer 2 connection between the third virtual router and the third AS instance; and initiate a third Layer 3 connection between the third virtual router and the third AS instance.

12. The system of claim 8, wherein the computing device is configured to instantiating the bridge by initiating an exchange of Interior Gateway Protocol (IGP) information between the first virtual router and the second virtual router.

13. A method for operating a telecommunications network, the method comprising:

receiving a request to connect a first autonomous system (AS) instance with a second AS instance, the first AS instance having a first AS number (ASN) and the second AS instance having a second ASN;

instantiating, in response to receiving the request, a bridge within the telecommunications network to facilitate communication between the first AS instance and the second AS instance, the bridge including a first virtual router communicatively coupled to a second virtual router;

associating, in response to receiving the request, the bridge with a bridge ASN, the bridge ASN being different from the first ASN and the second ASN;

establishing each of a first Layer 2 connection between the first virtual router and the first AS instance and a second Layer 2 connection between the second virtual router and the second AS instance; and establishing each of a first Layer 3 connection between the first virtual router and the first AS instance and a second Layer 3 connection between the second virtual router and the second AS instance.

14. The method of claim 13, wherein each of the first Layer 2 connection and the second Layer 2 connection are virtual local area network (VLAN) connections.

15. The method of claim 13, wherein establishing each of the first Layer 3 connection and the second Layer 3 further comprises providing the bridge ASN to the first AS instance and the second AS instance during respective Border Gateway Protocol (BGP) sessions.

16. The method of claim 13, wherein instantiating the bridge further comprises exchanging Interior Gateway Protocol (IGP) information between the first virtual router and the second virtual router for routing communications between the first virtual router and the second virtual router.

17. The method of claim 13 further comprising:
receiving a second request to connect each of the first AS instance and the second AS instance to a third AS instance;
adding a third virtual router to the bridge, the third virtual router communicatively coupled to each of the first virtual router and the second virtual router;
establishing a third Layer 2 connection between the third virtual router and the third AS instance; and
establishing a third Layer 3 connection between the third virtual router and the third AS instance.

18. The method of claim 13 further comprising routing traffic between the first AS instance and the second AS instance through the bridge.

\* \* \* \* \*